US012806762B2

(12) United States Patent
Michael et al.

(10) Patent No.: US 12,806,762 B2
(45) Date of Patent: Nov. 24, 2026

(54) SUBSTRATE MANIPULATION SYSTEM AND METHOD

(71) Applicant: Aptiv Manufacturing Management Services GmbH, Schaffhausen (CH)

(72) Inventors: Jeffrey Michael, Austintown, OH (US); Ryan Lewis, Niles, OH (US); Robert Dean, New Castle, PA (US); Jared Bilas, North Bloomfield, OH (US); Joseph Sudik, Jr., Niles, OH (US); David R. Peterson, Aurora, OH (US)

(73) Assignee: APTIV MANUFACTURING MANAGEMENT SERVICES GMBH, Schaffhausen (CH)

( * ) Notice: Subject to any disclaimer, the term of this patent is extended or adjusted under 35 U.S.C. 154(b) by 97 days.

(21) Appl. No.: 18/934,361

(22) Filed: Nov. 1, 2024

(65) Prior Publication Data

US 2026/0124742 A1 May 7, 2026

(51) Int. Cl.

| | |
|---|---|
| ***B60R 16/02*** | (2006.01) |
| ***B25J 9/10*** | (2006.01) |
| ***H02G 1/08*** | (2006.01) |
| ***H02G 3/00*** | (2006.01) |
| ***H02G 3/04*** | (2006.01) |
| ***H02G 3/06*** | (2006.01) |
| ***H02G 11/00*** | (2006.01) |
| *B62D 65/02* | (2006.01) |

(52) U.S. Cl.

CPC ............... *B25J 9/102* (2013.01); *B62D 65/02* (2013.01)

(58) Field of Classification Search

CPC .............. B60R 16/0215; H02G 3/0608; H02G 3/0437; H02G 11/00; H02G 1/08

See application file for complete search history.

(56) References Cited

U.S. PATENT DOCUMENTS

2024/0332940 A1* 10/2024 Kogure .................. H02G 11/00

FOREIGN PATENT DOCUMENTS

EP 3474401 A1 4/2019
EP 3742046 A1 * 11/2020 ........... B60Q 1/0088

OTHER PUBLICATIONS

Extended European Search Report for EP25202934.3 dated Feb. 26, 2026, 9 pages.

* cited by examiner

*Primary Examiner* — Timothy J Thompson
*Assistant Examiner* — Amol H Patel
(74) *Attorney, Agent, or Firm* — Miller Johnson

(57) ABSTRACT

A wiring harness installation assembly includes a first member and a second member. The first member includes a first arm and a second arm. The first arm has a first rotation feature. The second arm has a set of first ribs. The second member includes a third arm and a fourth arm. The third arm has a second rotation feature rotatably coupled to the first rotation feature. The fourth arm is configured to flex between a first position and a second position. The fourth arm has a set of second ribs configured to engage the set of first ribs to inhibit rotation of the first member relative to the second member when the fourth arm is in the first position. The first rotation feature is configured to rotate relative to the second rotation feature when the fourth arm is in the second position.

20 Claims, 4 Drawing Sheets

SUBSTRATE MANIPULATION SYSTEM AND METHOD

FIELD

The present disclosure relates to substrate manipulation systems and methods and more particularly to a system for manipulating a wire harness with a robot.

BACKGROUND

Modern vehicles (e.g., automobiles) rely on electrical wiring and electrical connections to facilitate the transmission of electricity within, and between various components of, the vehicle. Wiring harnesses (e.g., connectors and bundles of wires) play an important role in ensuring the integrity of these electrical connections and the reliability and performance of the vehicle. Wiring harnesses often lack the structural integrity (e.g., rigidity) to ensure the accurate and repeatable handling, positioning, and securement of the wiring harnesses and/or other components during an assembly process. Often, these wiring harnesses require manual installation or complex tooling to install, which can increase the cost and complexity of the wiring harnesses. For example, the wiring harnesses may be placed inside another component (e.g., a substrate) to provide the rigidity necessary to install the wiring harness robotically. These substrates are often costly and complex. In view of the foregoing, while known substrate manipulation systems for vehicle wiring systems have proven acceptable for their intended purpose, a continuous need for improvement remains in the pertinent art to address the challenges associated with accurate and efficient assembly of the wiring harnesses.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

This section provides a general summary of the disclosure, and is not a comprehensive disclosure of its full scope or all of its features.

One aspect of the disclosure provides a wiring harness installation assembly. The wiring harness installation assembly includes a first member and a second member. The first member includes a first arm and a second arm. The first arm has a first rotation feature. The second arm has a set of first ribs. The second member includes a third arm and a fourth arm. The third arm has a second rotation feature rotatably coupled to the first rotation feature. The fourth arm is configured to flex between a first position and a second position. The fourth arm has a set of second ribs configured to engage the set of first ribs to inhibit rotation of the first member relative to the second member when the fourth arm is in the first position. The first rotation feature is configured to rotate relative to the second rotation feature when the fourth arm is in the second position.

Another aspect of the disclosure provides a first wiring harness installation member. The first wiring harness installation member includes a first arm, a second arm, and at least one wall. The at least one wall includes a first end and a second end. The first arm extends from the first end of the at least one wall and includes a first rotation feature configured to rotatably couple to a second rotation feature of a second wiring harness installation member. The second arm extends from the first end of the at least one wall and is configured to flex relative to the first end between a first position and a second position. The second arm includes a third rotation feature and a set of first ribs. The third rotation feature is configured to rotatably couple to a fourth rotation feature of the second wiring harness installation member. The set of first ribs is configured to engage a set of second ribs on the second wiring harness installation member to inhibit rotation of the first wiring harness installation member relative to the second wiring harness installation member when the second arm is in the first position. The first rotation feature is configured to rotate relative to the second rotation feature when the first arm is in the second position.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1A:
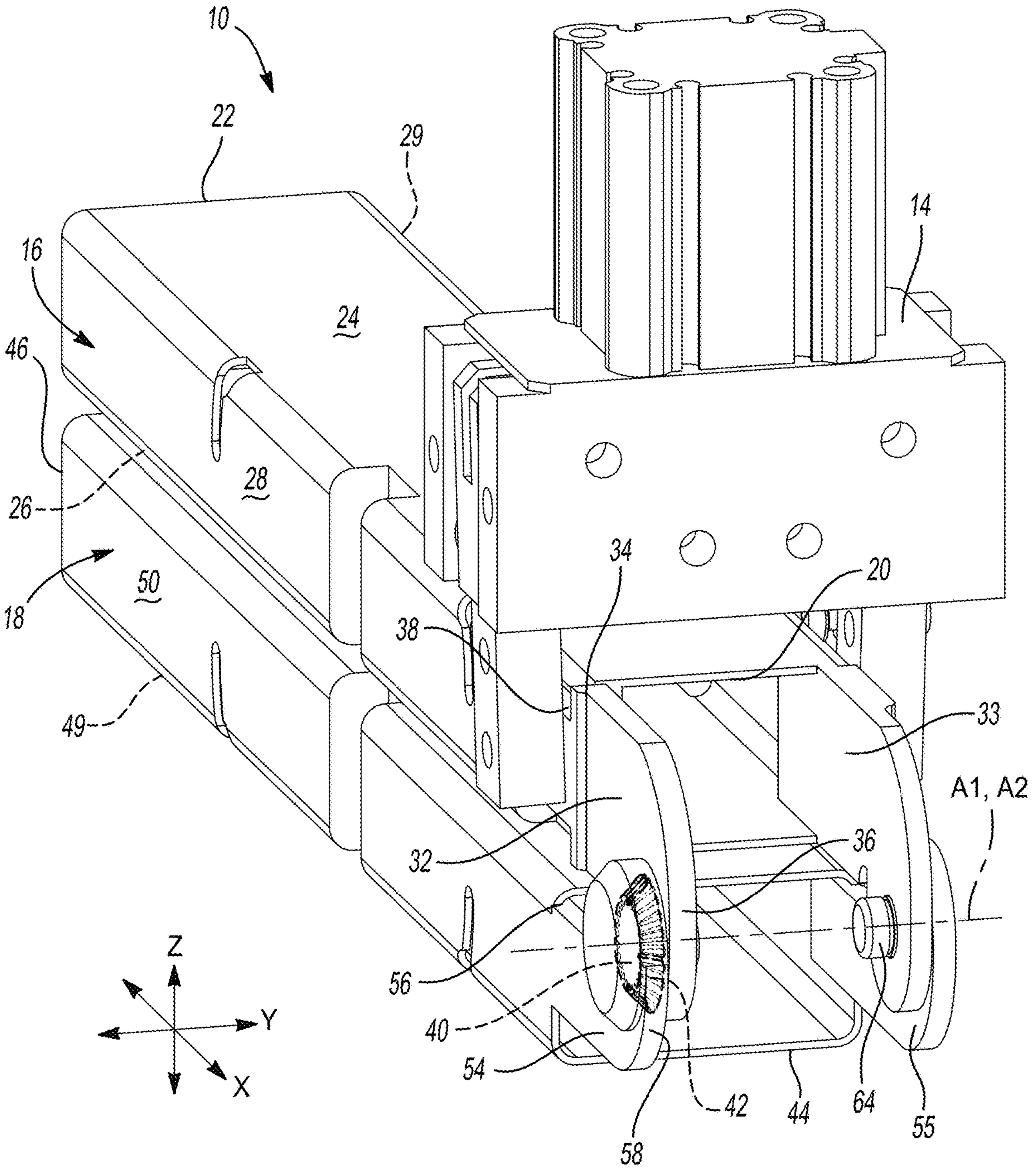
FIG. 1A is a perspective view of a wiring harness installation assembly in a first orientation in accordance with the principles of the present disclosure.
Figure 1B:
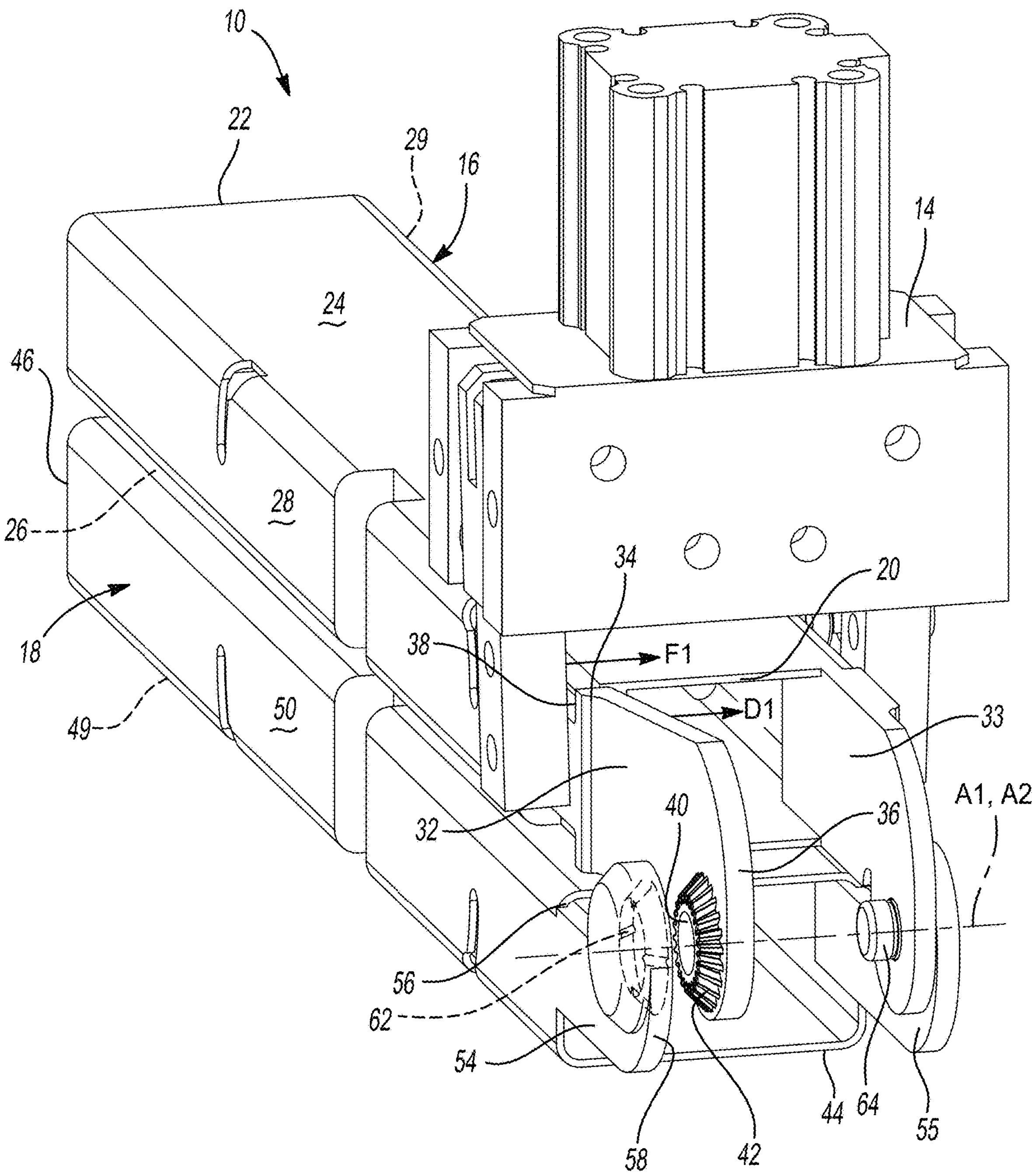
FIG. 1B is a perspective view of the wiring harness installation assembly of FIG. 1A in a second orientation in accordance with the principles of the present disclosure.
Figure 1C:
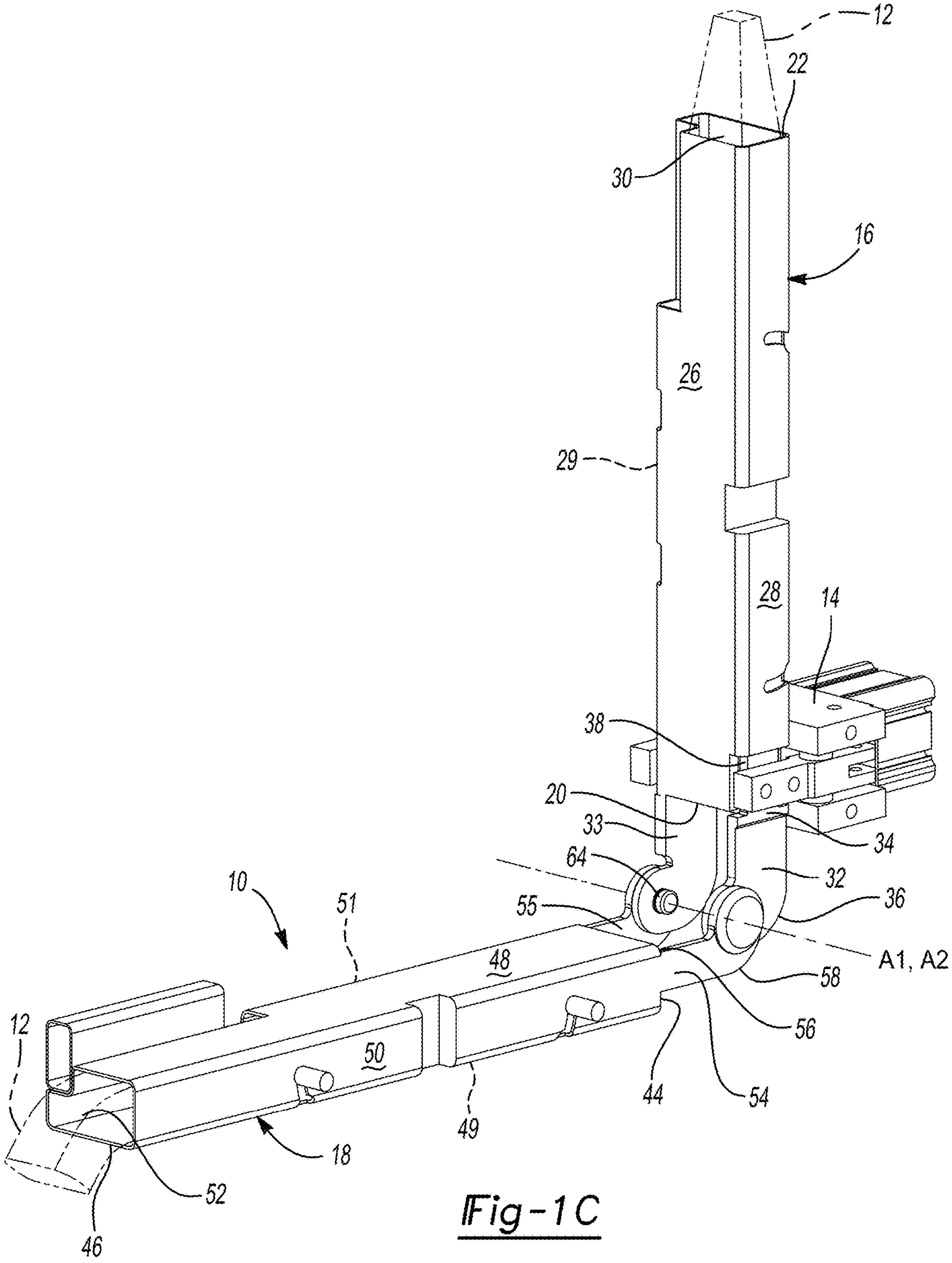
FIG. 1C is a perspective view of the wiring harness installation assembly of FIG. 1A in a third orientation in accordance with the principles of the present disclosure.

With reference to FIGS. 1A, 1B, and 1C, a wiring harness installation assembly 10 is illustrated. As will be explained in more detail below, the wiring harness installation assembly 10 is used during installation of a wiring harness 12. For example, the wiring harness installation assembly 10 may be used during installation of the wiring harness 12 in a vehicle (not shown) such as an automobile. While the wiring harness installation assembly 10 is generally shown and described herein as being used for installing a wiring harness 12, it will be appreciated that the wiring harness installation assembly 10 may be used for installing other flexible substrates (e.g., fabric, cables, upholstery, etc.) within the scope of the present disclosure.

The wiring harness installation assembly 10 may include a first member 16 and a second member 18. The second member 18 may be coupled (e.g., rotatably-coupled) to the first member 16. In some implementations, the first member 16 and/or the second member 18 receives the wiring harness 12.

During installation (e.g., installation into a vehicle), the first member 16 and/or the second member 18 may be manipulated by a tool 14. In some implementations, the tool 14 is an end effector (e.g., an end effector located at an end of a robotic arm).

While certain features are shown and described herein as being on, or a part of, the first member 16 or the second member 18, it will be appreciated that those features may be on, or a part of, the other of the first member 16 or the second member 18 or both the first member 16 and the second member 18 within the scope of the present disclosure.

With reference to FIGS. 1A-1C and 2, the first member 16 may include a first end 20, a second end 22 opposite the first end 20, an upper wall 24, a lower wall 26, a first side wall 28, and a second side wall 29. The upper wall 24 may extend between the first end 20 and the second end 22. The lower wall 26 may be opposite the upper wall 24 and extend between the first end 20 and the second end 22. The first side wall 28 may extend between the upper wall 24 and the lower wall 26 and between the first end 20 and the second end 22. The second side wall 29 may be opposite the first side wall 28 and extend between the upper wall 24 and the lower wall 26 and between the first end 20 and the second end 22.

In some implementations, the upper wall 24, the lower wall 26, the first side wall 28, and the second side wall 29 form a hollow conduit 30 in which the wiring harness 12 may be disposed during an installation method. In this regard, while the conduit 30 is generally shown and described herein as being formed by the upper wall 24, the lower wall 26, the first side wall 28, and the second side wall 29, it will be appreciated that the conduit 30 may be formed by one or more of the upper wall 24, the lower wall 26, the first side wall 28, and the second side wall 29 within the scope of the present disclosure. For example, the conduit 30 may be formed by one of the upper wall 24, the lower wall 26, the first side wall 28, or the second side wall 29 such that the conduit 30 has a cylindrical cross-sectional shape, a triangular cross-sectional shape, a planar cross-sectional shape, etc.

The first member 16 may further include a first arm 32 and a second arm 33. The first arm 32 and/or the second arm 33 may extend from the first end 20 of the first member 16. In some implementations, the first arm 32 extends from the first side wall 28 (e.g., in a direction opposite the second end 22) and the second arm 33 extends from second side wall 29 (e.g., in a direction opposite the second end 22). In some implementations, the first arm 32 is integrally formed with the first side wall 28. While the first arm 32 and the second arm 33 are shown and described herein as being on or a part of the first member 16, it will be appreciated that the first arm 32 and the second arm 33 may be on or a part of the second member 18 within the scope of the present disclosure.

Figure 2:
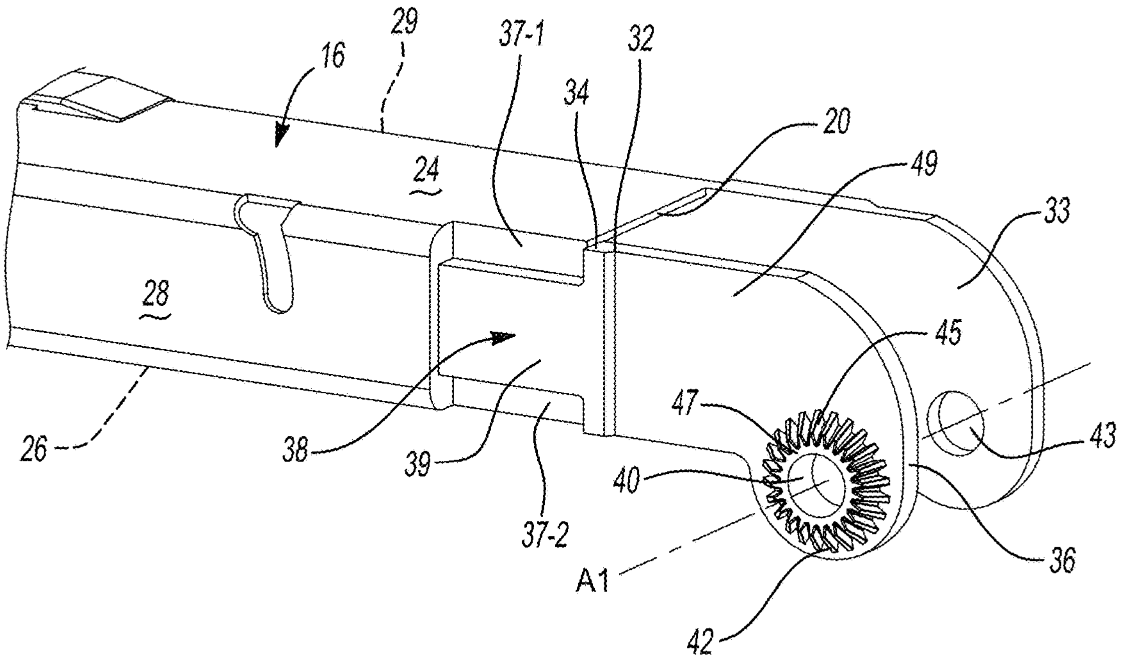
FIG. 2 is a perspective view of a first member of a wiring harness installation assembly in accordance with the principles of the present disclosure.

With reference to FIG. 2, the first arm 32 may include a first end 34, a second end 36, a manipulation feature 38, a first rotation feature 40, and a set of first ribs 42. The second end 36 may be opposite the first end 34. The first end 34 of the first arm 32 may be disposed proximate, and/or coupled to, the first end 20 of the first member 16.

In some implementations, the manipulation feature 38 includes at least one recess 37 and a protrusion 39. The manipulation feature 38 may be disposed proximate the first end 34 of the first arm 32. The at least one recess 37 may include a first recess 37-1 and a second recess 37-2. In some implementations, the recess(es) 37 include a recess formed in (i) one of the upper wall 24 or the lower wall 26, (ii) the first side wall 28 of the first member 16, and/or (iii) the first end 34 of the first arm 32. For example, the first recess 37-1 may be at least partially defined by (i) the upper wall 24 and the first side wall 28 of the first member 16 and (ii) the first end 34 of the first arm 32. The second recess 37-2 may be at least partially defined by (i) the lower wall 26 and the first side wall 28 of the first member 16 and (ii) the first end 34 of the first arm 32. The protrusion 39 may be disposed between the first recess 37-1 and the second recess 37-2. For example, the protrusion 39 may be a non-recessed area of the first arm 32 and/or the first side wall 28 disposed between the first recess 37-1 and the second recess 37-2. In some implementations, the protrusion 39 extends from the first side wall 28 and/or the first arm 32 (e.g., in the Y-direction).

During a method of installing a substrate (e.g., wiring harness 12), the manipulation feature 38 (e.g., the recess 37 and/or the protrusion 39) may receive and/or engage the tool 14 to allow the tool 14 to manipulate the first member 16. For example, the tool 14 may be disposed within the recess 37 and/or engage the protrusion 39 to rotate the first member 16 relative to the second member 18.

With reference to FIG. 2, the first rotation feature 40 and the set of first ribs 42 may be disposed proximate the second end 36 of the first arm 32. The first rotation feature 40 may be an axle or an aperture defining a first axis of rotation A1. In some implementations, the first rotation feature 40 is an aperture. In an assembled configuration (FIG. 1A), the first rotation feature 40 may engage (e.g., receive, be disposed within in, couple to, etc.) a corresponding rotation feature on the second member 18. As will be explained in more detail below, during using of the wiring harness installation assembly 10, the first member 16 may rotate relative to the second member 18 about the axis A1.

The set of first ribs 42 may extend from the first arm 32 and be disposed (e.g., circumferentially disposed) around the first rotation feature 40. In some implementations, the set of first ribs 42 form another rotation feature (e.g., a protrusion 41) that extends from the first arm 32. The set of first ribs 42 may be equally spaced around the first rotation feature 40. In some implementations, the set of first ribs 42 may at least partially define the first rotation feature 40. When the first arm 32 is in a first position (FIG. 1A), the set of first ribs 42 may engage a corresponding feature on the second member 18 such that the set of first ribs 42 inhibit rotation of the first member 16 relative to the second member 18 about the axis A1.

Each rib 42 of the set of first ribs 42 may include an outer surface 45. In some implementations, the outer surface(s) 45 of the set of first ribs 42 collectively form a first frustoconical shape 47 extending from an outer surface 49 of the first arm 32. The protrusion 41 may be at least partially defined by the first frustoconical wall 47. In the assembled configuration, the protrusion 41 may mate with a rotation feature on the second member 18. For example, as will be described in more detail below, when the first arm 32 is in the first position (FIG. 1A), the protrusion 41 may be disposed within a corresponding rotation feature (e.g., a recess) formed in the second member 18.

The second arm 33 may include a second rotation feature 43. The second rotation feature 43 may be an axle or an aperture. In some implementations, the second rotation feature 43 is an aperture. The second rotation feature 43 may engage (e.g., receive, be disposed within in, couple to, etc.) a corresponding rotation feature on the second member 18. The second rotation feature 43 may be coaxial with the first rotation feature 40 (e.g., along the axis A1). The second rotation feature 43, along with the first rotation feature 40, may allow the first member 16 to rotate relative to the second member 18.

While the manipulation feature 38 is shown and described herein as being on or a part of the first arm 32, it will be appreciated that the manipulation feature 38 may be on, or a part of, the second arm 33 within the scope of the present disclosure. Additionally, while the set of first ribs 42 is shown and described herein as being on, or a part of, the first arm 32, it will be appreciated that the set of first ribs 42 may be on or a part of the second arm 33 within the scope of the present disclosure. For example, the set of first ribs 42 may extend from the second arm 33 and be disposed (e.g., circumferentially-disposed) around the second rotation feature 43.

At least one of the first arm 32 or the second arm 33 may be flexible and/or resilient. For example, as illustrated in FIG. 1B, upon applying a force F1 on the first arm 32 and/or the second arm 33 in a first direction D1 (e.g., the direction of the axis A1; the Y-direction), the first arm 32 and/or the second arm 33 may move (e.g., flex, bend, etc.) towards the other of the first arm 32 or the second arm 33 such that the first arm 32 and/or the second arm 33 (e.g., the set of first ribs 42) disengages from the second member 18 allowing the first member 16 to rotate freely relative to the second member 18 about the first axis A1. Upon removing the force F1 from the first arm 32 and/or the second 33, the first arm 32 and/or the second arm 33 may flex and/or move away from the other of the first arm 32 or the second arm 33 such that the set of first ribs 42 engage a correspond feature on the second member 18 to inhibit rotation of the first member 16 relative to the second member 18. In some implementations, during a method of using the wiring harness installation assembly 10, the tool 14 engages the manipulation feature 38 and the tool 14 imparts the force F1 on the first arm 32 and/or the second arm 33.

With reference to FIGS. 1A-1C and 3, the second member 18 may include a first end 44, a second end 46 opposite the first end 44, an upper wall 48, a lower wall 49, a first side wall 50, and a second side wall 51. The upper wall 48 may extend between the first end 44 and the second end 46. The lower wall 49 may be opposite the upper wall 48 and may extend between the first end 44 and the second end 46. The first side wall 50 may extend between the upper wall 48 and the lower wall 49 and between the first end 44 and the second end 46. The second side wall 51 may be opposite the first side wall 50 and extend between the upper wall 48 and the lower wall 49 and between the first end 44 and the second end 46.

In some implementations, the upper wall 48, the lower wall 49, the first side wall 50, and the second side wall 51 form a hollow conduit 52 in which the wiring harness 12 is disposed during an installation method. In this regard, while the conduit 52 is generally shown and described herein as being formed by the upper wall 48, the lower wall 49, the first side wall 50, and the second side wall 51, it will be appreciated that the conduit 52 may be formed by one or more of the upper wall 48, the lower wall 49, the first side wall 50, and the second side wall 51 within the scope of the present disclosure. For example, the conduit 52 may be formed by one of the upper wall 48, the lower wall 49, the first side wall 50, or the second side wall 51 such that the conduit 52 has a cylindrical cross-sectional shape, a triangular cross-sectional shape, a planar cross-sectional shape, etc.

Figure 3:
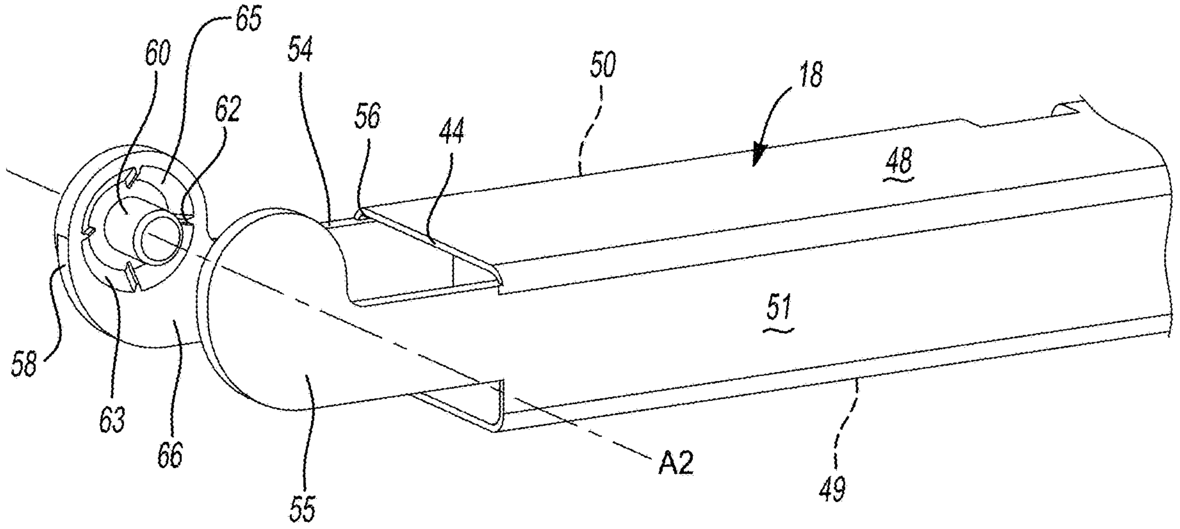
FIG. 3 is a perspective view of a second member of a wiring harness installation assembly in accordance with the principles of the present disclosure.

With reference to FIG. 3, the second member 18 may include a first arm 54 and a second arm 55. The first arm 54 and/or the second arm 55 may extend from the first end 44 of the second member 18. In some implementations, the first arm 54 extends from the first side wall 50 (e.g., in a direction opposite the second end 46) and the second arm 55 extends from the second side wall 51 (e.g., in a direction opposite the second end 46). The first arm 54 and/or the second arm 55 may also extend from the second end 46 of the second member 18 within the scope of the present disclosure. While the first arm 54 and the second arm 55 are shown and described herein as being on or a part of the second member 18, it will be appreciated that the first arm 54 and the second arm 54 may be on or a part of the first member 16 within the scope of the present disclosure.

The first arm 54 and/or the second arm 55 of the second member 18 may be coupled (e.g., rotatably-coupled) to the first arm 32 and/or the second arm 33 of the first member 16. For example, the first arm 32 of the first member 16 may be coupled to the first arm 54 of the second member 18, and the second arm 33 of the first member 16 may be coupled to the second arm 55 of the second member 18.

The first arm 54 may include a first end 56, a second end 58, a third rotation feature 60, and a set of second ribs 62. The second end 58 may be opposite the first end 56. The first end 56 of the first arm 54 may be disposed proximate the first end 44 of the second member 18.

The third rotation feature 60 and the set of second ribs 62 may be disposed proximate the second end 58 of the arm 54. The third rotation feature 60 may define a second axis of rotation A2. The second axis A2 may be parallel to the first axis A1. In some implementations, the second axis A2 is coaxial with the first axis A1. The third rotation feature 60 may be an axle or an aperture. In some implementations, the first rotation feature 40 may be an axle or an aperture and the third rotation feature 60 may be the other of the axle or the aperture. In some implementations, the third rotation feature 60 is an axle. The third rotation feature 60 may engage (e.g., receive, be disposed within in, couple to) the first rotation feature 40.

The set of second ribs 62 may extend from the first arm 54 and be disposed (e.g., circumferentially disposed) around the third rotation feature 60. The set of second ribs 62 may be equally spaced around the third rotation feature 60. In some implementations, the set of second ribs 62 includes four ribs. The set of second ribs 62 may engage the set of first ribs 42 to inhibit rotation of the first member 16 relative to the second member 18 when the first arm 32 is in a first position (FIG. 1A). In some implementations, the third rotation feature 60 and/or the set of second ribs 62 are at least partially recessed within the first arm 54.

The first arm 54 may further include a rotation feature 63 disposed about the rotation feature 60. In some implementations, the rotation feature 63 includes a recess. The recess 63 may be at least partially defined by a second frustoconical wall 65. The set of second ribs 62 may extend from the second frustoconical wall 65. The second frustoconical wall 65 may surround the third rotation feature 60. In some implementations, the second frustoconical wall 65 is formed in an inner surface 66 of the first arm 54. When the wiring harness installation assembly 10 is in an assembled configuration (FIG. 1A), the second frustoconical wall 65 may face the first frustoconical wall 47, and the set of first ribs 42 may engage the set of second ribs 62.

With reference to FIG. 1B, the second arm 55 may further include a fourth rotation feature 64. The fourth rotation feature 64 may be an axle or an aperture. In some implementations, the second rotation feature 43 may be an axle or an aperture and the fourth rotation feature 64 may be the other of the axle or the aperture. In some implementations, the fourth rotation feature 64 is an axle. In an assembled configuration, the fourth rotation feature 64 may engage (e.g., receive, be disposed within in, couple to, etc.) the second rotation feature 43 to allow the first member 16 to rotate relative to the second member 18. The fourth rotation feature 64 may be coaxial with the third rotation feature 60 (e.g., along the axis A2).

While the set of second ribs 62 is shown and described herein as being on or a part of the first arm 54, it will be appreciated that the set of second ribs 62 may be on or a part of the second arm 55 within the scope of the present disclosure. For example, the set of second ribs 62 may be disposed (e.g., circumferentially-disposed) around the fourth rotation feature 64.

With reference to FIG. 1A-3, a method of using a wiring harness installation assembly (e.g., the wiring harness installation assembly 10) will be described. The wiring harness installation assembly 10 may begin in a first configuration (FIG. 1A). In the first configuration, the first member 16 may be disposed above the second member 18 (e.g., in the Z-direction). Additionally, the first arm 32 may be in the first position (FIG. 1A). When the first arm 32 is in the first position (FIG. 1A), movement (e.g., rotation) of the first member 16 relative to the second member 18 may be inhibited by the engagement of the set of first ribs 42 with the set of second ribs 62.

The tool 14 may move in the Z-direction to engage the first member 16 (e.g., the flexible arm 32). In some implementations, the tool 14 engages the manipulation feature 38 (e.g., the protrusion 39). Once the tool 14 engages the manipulation feature 38 (e.g., the protrusion 39), the tool 14 moves in the Y-direction. Movement of the tool in the Y-direction imparts the force F1 on the manipulation feature 38 that causes the first arm 32 to move (e.g., flex, bend, etc.) in the direction D1 (e.g., the Y-direction). In this regard, movement of the tool in the Y-direction causes the first arm 32 to move from the first position (FIG. 1A) to the second position (FIG. 1B). As the first arm 32 moves from the first position (FIG. 1A) to the second position (FIG. 1B), the set of first ribs 42 disengages from the set of second ribs 62. When the first arm 32 is in the second position (FIG. 1B), the set of first ribs 42 is disengaged from the set of second ribs 62. Once the first arm 32 is in the second position (FIG. 1B), the first member 16 is free to move (e.g., rotate) to the second position (FIG. 1C). For example, the tool 14 may rotate the first member 16 about the first axis A1 from the first position (FIG. 1A) to the second position (FIG. 1C) or any number of intermediary positions, and into an assembly location within a vehicle for example.

The following clauses provide an exemplary configuration for a wiring harness installation assembly, as described above.

Clause 1: A wiring harness installation assembly comprising: a first member including a first arm having a first rotation feature, and a second arm having a set of first ribs; and a second member including a third arm having a second rotation feature rotatably coupled to the first rotation feature, and a fourth arm configured to flex between a first position and a second position, the fourth arm having a set of second ribs configured to engage the set of first ribs to inhibit rotation of the first member relative to the second member when the fourth arm is in the first position, the first rotation feature configured to rotate relative to the second rotation feature when the fourth arm is in the second position.

Clause 2: The assembly of clause 1, wherein the first rotation feature includes one of an axle or an aperture, and the second rotation feature includes the other of an axle or an aperture.

Clause 3: The assembly of clause 1 or 2, wherein the set of first ribs at least partially form a third rotation feature.

Clause 4: The assembly of clause 3, wherein the set of second ribs at least partially form a fourth rotation feature.

Clause 5: The assembly of any of clauses 1 through 4, wherein the set of first ribs at least partially form a recess, and wherein the set of second ribs at least partially form a protrusion disposed within the recess.

Clause 6: The assembly of any of clauses 1 through 5, wherein the fourth arm includes an aperture, wherein the second arm includes an axle rotatably disposed within the aperture.

Clause 7: The assembly of clauses 5 or 6, wherein the second arm includes a first frustoconical wall at least partially defining the recess.

Clause 8: The assembly of clause 7, wherein the set of first ribs extend from the first frustoconical wall.

Clause 9: The assembly of clauses 7 or 8, wherein the set of second ribs each include an outer surface collectively forming a second frustoconical wall, and wherein the first frustoconical wall faces the second frustoconical wall.

Clause 10: The assembly of any of clauses 1 through 9, wherein the fourth arm includes a first end coupled to an end of the second member, and a second end opposite the first end, and wherein the set of second ribs are disposed proximate the second end.

Clause 11: The assembly of clause 10, wherein the fourth arm includes a manipulation feature disposed proximate the end of the second member.

Clause 12: The assembly of c any of clauses 1 through 11, wherein the first member forms a first conduit, and the second member forms a second conduit.

Clause 13: A first wiring harness installation member comprising: at least one wall including a first end and a second end; a first arm extending from the first end of the at least one wall and including a first rotation feature configured to rotatably couple to a second rotation feature of a second wiring harness installation member; and a second arm extending from the first end of the at least one wall and configured to flex relative to the first end between a first position and a second position, the second arm including: a third rotation feature configured to rotatably couple to a fourth rotation feature of the second wiring harness installation member; and a set of first ribs configured to engage a set of second ribs on the second wiring harness installation member to inhibit rotation of the first wiring harness installation member relative to the second wiring harness installation member when the second arm is in the first position, the first rotation feature configured to rotate relative to the second rotation feature when the first arm is in the second position.

Clause 14: The first wiring harness installation member of clause 13, wherein the first rotation feature includes one of an axle or an aperture, and the second rotation feature includes the other of an axle or an aperture.

Clause 15: The first wiring harness installation member of clause 13 or 14, wherein the set of first ribs at least partially form the third rotation feature.

Clause 16: The first wiring harness installation member of any of clauses 13 through 15, wherein the set of second ribs at least partially form the fourth rotation feature.

Clause 17: The first wiring harness installation member of any of clauses 13 through 16, wherein the set of first ribs at least partially form a recess, and wherein the set of second ribs at least partially form a protrusion disposed within the recess.

Clause 18: The first wiring harness installation member of any of clauses 13 through 17, wherein the third rotation feature includes a protrusion, and wherein the second arm includes an aperture extending through the protrusion.

Clause 19: The first wiring harness installation member of any of clauses 13 through 18, wherein the set of first ribs each include an outer surface collectively forming a frustoconical wall.

Clause 20: The first wiring harness installation member of any of clauses 13 through 19, wherein the second arm includes a manipulation feature configured to receive a tool.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. A wiring harness installation assembly comprising:

a first member including a first arm having a first rotation feature, and a second arm having a set of first ribs; and a second member including a third arm having a second rotation feature rotatably coupled to the first rotation feature, and a fourth arm configured to flex between a first position and a second position, the fourth arm having a set of second ribs configured to engage the set of first ribs to inhibit rotation of the first member relative to the second member when the fourth arm is in the first position, the first rotation feature configured to rotate relative to the second rotation feature when the fourth arm is in the second position.

2. The assembly of claim 1, wherein the first rotation feature includes one of an axle or an aperture, and the second rotation feature includes the other of an axle or an aperture.

3. The assembly of claim 1, wherein the set of first ribs at least partially form a third rotation feature.

4. The assembly of claim 3, wherein the set of second ribs at least partially form a fourth rotation feature.

5. The assembly of claim 4, wherein the set of first ribs at least partially form a recess, and wherein the set of second ribs at least partially form a protrusion disposed within the recess.

6. The assembly of claim 5, wherein the fourth arm includes an aperture, wherein the second arm includes an axle rotatably disposed within the aperture.

7. The assembly of claim 6, wherein the second arm includes a first frustoconical wall at least partially defining the recess.

8. The assembly of claim 7, wherein the set of first ribs extend from the first frustoconical wall.

9. The assembly of claim 8, wherein the set of second ribs each include an outer surface collectively forming a second frustoconical wall, and wherein the first frustoconical wall faces the second frustoconical wall.

10. The assembly of claim 1, wherein the fourth arm includes a first end coupled to an end of the second member, and a second end opposite the first end, and wherein the set of second ribs are disposed proximate the second end.

11. The assembly of claim 10, wherein the fourth arm includes a manipulation feature disposed proximate the end of the second member.

12. The assembly of claim 1, wherein the first member forms a first conduit, and the second member forms a second conduit.

13. A first wiring harness installation member comprising:

at least one wall including a first end and a second end;

a first arm extending from the first end of the at least one wall and including a first rotation feature configured to rotatably couple to a second rotation feature of a second wiring harness installation member; and a second arm extending from the first end of the at least one wall and configured to flex relative to the first end between a first position and a second position, the second arm including:

a third rotation feature configured to rotatably couple to a fourth rotation feature of the second wiring harness installation member; and a set of first ribs configured to engage a set of second ribs on the second wiring harness installation member to inhibit rotation of the first wiring harness installation member relative to the second wiring harness installation member when the second arm is in the first position, the first rotation feature configured to rotate relative to the second rotation feature when the first arm is in the second position.

14. The first wiring harness installation member of claim 13, wherein the first rotation feature includes one of an axle or an aperture, and the second rotation feature includes the other of an axle or an aperture.

15. The first wiring harness installation member of claim 13, wherein the set of first ribs at least partially form the third rotation feature.

16. The first wiring harness installation member of claim 15, wherein the set of second ribs at least partially form the fourth rotation feature.

17. The first wiring harness installation member of claim 16, wherein the set of first ribs at least partially form a recess, and wherein the set of second ribs at least partially form a protrusion disposed within the recess.

18. The first wiring harness installation member of claim 15, wherein the third rotation feature includes a protrusion, and wherein the second arm includes an aperture extending through the protrusion.

19. The first wiring harness installation member of claim 15, wherein the set of first ribs each include an outer surface collectively forming a frustoconical wall.

20. The first wiring harness installation member of claim 13, wherein the second arm includes a manipulation feature configured to receive a tool.

* * * * *